United States Patent [19]

Golownia

[11] 4,271,277

[45] Jun. 2, 1981

[54] CURING CATALYST FOR THERMOSETTING POWDER PAINTS

[75] Inventor: Robert F. Golownia, Northfield, Ohio

[73] Assignee: SCM Corporation, New York, N.Y.

[21] Appl. No.: 82,715

[22] Filed: Oct. 9, 1979

[51] Int. Cl.³ .................. C08L 61/28; C08L 61/26; C08L 63/00

[52] U.S. Cl. .................. 525/351; 260/37 N; 525/511; 525/516; 525/518; 525/519; 525/934

[58] Field of Search ............... 525/351, 398, 400, 511, 525/484, 516, 481, 518, 162, 519, 157, 186

[56] References Cited

U.S. PATENT DOCUMENTS

| | | | |
|---|---|---|---|
| T916,002 | 11/1973 | Launikitis | 525/486 |
| 3,915,917 | 10/1975 | Weiant | 260/29.6 H |

FOREIGN PATENT DOCUMENTS 941995  2/1974  Canada ..................... 525/486

OTHER PUBLICATIONS

Chem. Abst., 83, 1975, 117098t.

*Primary Examiner*—C. A. Henderson
*Attorney, Agent, or Firm*—Thomas M. Schmitz

[57] ABSTRACT

Thermosetting powder coatings comprising reactive polymers containing reactive carboxyl, hydroxyl, and/or amide groups and adapted to be cross-linked with aminoplast resins are substantially improved by the inclusion of at least about 0.25% by weight of a heat curing catalyst. The catalyst is an amine salt of cyclohexyl sulfamic acid.

7 Claims, No Drawings

CURING CATALYST FOR THERMOSETTING POWDER PAINTS

BACKGROUND OF THE INVENTION

This invention relates to improved thermosetting powder paints and more particularly pertains to a curing catalyst for promoting chemical cross-linking of thermosetting polymer binders in the powder paint upon exposure to heat.

Powder paints are ordinarily manufactured from raw batch ingredients comprising resinous binders, opacifying and filler pigmentary solids, plasticizers, and other additives to provide opacity, good film properties, and adhesion to substrates. The raw batch ingredients are uniformly mixed, formed into coherent extrudate by hot extrusion, and then comminuted to form small particle powder paints which are ordinarily free flowing at normal room temperature. Powder paints usually are uniform small powders passing 325 mesh or less than about 44 microns. Powder paints contain little or no fugitive solvents and depend upon their own inherent characteristics of the powder to melt, level, coalesce, and fuse to form an attractive coherent film on the substrate. The powder must not fuse in the container and be susceptible to cold flow so as to maintain individual powder particles prior to use.

Thermosetting powder coating composition based on reactive polymers having reactive carboxyl or hydroxyl or amide groups adapted to be cross-linked by tetrakis-methoxymethyl-glycoluril are shown in U.S. Pat. No. 4,118,437. Similarly, a p-toluene sulfonic acid catalyst for powder paints is shown in U.S. Defensive Publication No. 624,135. However, melamine powder coatings often exhibit a gassing effect during cure and often exhibit poor heat storage stability.

It now has been found that substantially improved thermosetting powder coatings based on reactive polymers adapted to be cross-linked by aminoplast resin cross-linker can be produced by the inclusion of a minor amount of a heat curing catalyst comprising an amine salt of cyclohexyl sulfamic acid. The cured powder coatings produce pin-hole free continuous surface coatings and avoid porous or ripple surfaces which can occur due to the formation of volatile by-products formed during the fusing and curing steps.

SUMMARY OF THE INVENTION

Briefly, thermosetting powder coating based reacted polymers and cross-linking aminoplast resins are substantially improved by the inclusion of at least about 0.25% by weight curing catalyst consisting of an amine salt of cyclohexyl sulfamic acid.

DETAILED DESCRIPTION OF THE INVENTION

This invention pertains to thermosetting powder coatings which contain a heat curing catalyst of an amine salt of cyclohexyl sulfamic acid.

Referring first to the catalyst, amine salts of cyclohexyl sulfamic acid can be prepared by dissolving cyclohexyl sulfamic acid in acetone and slowly adding an acetone solution of amine wherein the amount of amine is approximately in stoichiometric proportions to the sulfamic acid. An amine salt results after sufficient time and the salt can be filtered from the acetone solution and dried at about 60° C. Amines include ammonia and derivatives of ammonia commonly referred to as primary, secondary, or tertiary amines. Suitable amines include for example, methylamine, dimethylamine, trimethylamine, similar ethyl-, propyl-, and butylamines as well as similar alkyl amines, mixed alkyl amines such as n-methyl-n-propane amine, aromatic amines such as cyclohexyl amine or aniline and similar amines capable of reacting with cyclohexyl sulfamic to provide an amine salt thereof. The powder coating compsition contains at least 0.25% and preferably between 0.25% and 0.6% by weight heat curing catalyst of an amine salt of cyclohexyl sulfamic acid.

Referring next to the reactive polymer adapted to be cross-linked by aminoplast cross-linker, the reactive polymer can be polymer having reactive hydroxyls, or carboxyls, or amide groups. The polymer can have a molecular weight between about 1,000 and 10,000 and typically can contain by weight between 1% and 20% reactive carboxyl, hydroxyl or amide groups. Generally, the polymers can be epoxy polymers, polyester polymers, acrylic polymers, phenolic polymers, vinyl polymers, and similar polymers. The polymers are preferably solid polymers with a melt temperature above about 80° C. and between 80° C. and 200° C. and preferably between 100° C. and 140° C. All polymers can have reactive hydroxyl, carboxyl or amide groups suitably grafted onto the polymer such as by esterification in polyester polymers or by addition polymerization of carboxyl or hydroxyl monomers in acrylic or vinyl polymers. Particularly preferred reactive polymers are acrylic polymers and polyester polymers. Hydroxyl or carboxyl terminated polyester polymers can be produced by an esterification reaction of higher glycols together with alpha, beta-unsaturated dicarboxylic acid such as maleic or fumaric acid or maleic anhydride or saturated aliphatic or aromatic dicarboxylic acid can be included. The preferred glycols are higher aliphatic glycols such as 1,3-butylene glycol or 1,4-butylene glycol; 1,3-hexanediol and 1,6-hexanediol; neopentyl glycol as well as minor amounts of polyols such as trimethylol propane or ethane, or petaerythritol. The glycols are reacted with the dicarboxylic acids at temperatures preferably above about 200° C. to substantially coreact all the available carboxylic acid to provide a hydroxyl polyester. Excess dicarboxylic acid is reacted completely with polyol to provide a hydroxyl polyester. Excess dicarboxylic acid is reacted completely with polyol to provide a carboxylic acid polyester polymer.

Aminoplast resins for cross-linking the reactive polymer by coreacting with the carboxyl, hydroxyl and/or amide groups on the reactive polymer. Aminoplast resins can be selected from melamine or melamine derivatives such as methylol melamine or similar alkylated melamine formaldehyde reactive products as well as other aminoplast resin such as urea-formaldehyde and glycoluril-formaldehyde products. The aminoplast resins cross-link the reactive polymer upon heating in the presence of an amine salt of cyclohexyl sulfamic acid in accordance with this invention. The reactive polymer and aminoplast resin are mixed together on a basis of about 25 to 35 weight parts of aminoplast resin per 100 weight parts of reactive polymer. Preferred aminoplast cross-linking agents are alkylated glycoluril compounds which can be produced by reacting two moles of urea with one mole of glyoxal followed by reaction with 1 to 4 moles of formaldehyde to provide a methylolated glycoluril and/or partially alkylated as more particularly set forth in U.S. Pat. No. 4,064,191. Useful glycoluril derivatives mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. If desired, one may utilize mixed ethers such as the diethyl, dimethylethers of tetramethyiol glycoluril, the diethyl, dipropylethers of tetramethyiol glycoluril, the dibutyl, diethylethers of tetramethyiol glycouril, the diethyl, dihexylethers of tetramethyiol glycoluril and the like.

The resinous binder can be thoroughly and uniformly mixed with raw batch ingredients by homogenizing the binders, pigmentary solids, plasticizers and other components to uniformly blend the resinous binder with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonitrile blue, ultra-marine blue, cadmium pigments, chromium pigments, and the like. Filler pigments such as clay, silica, talc, mica, wollastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder wherein the extruder is internally heated by an indirect heating fluid such as steam, hot water, or synthetic oil whereupon the exit extruder temperature is regulated according to the type of powder paint being produced but generally is between about 90° C. and 150° C. at the heated exit die of the screw fed extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrate and moderately heated between temperatures of about 150° C. and 200° C. to obtain desirable flow out. The advantages of this invention are further illustrated in the following examples.

EXAMPLE 1

(a) Catalyst. An amine salt catalyst was prepared by dissolving 53.7 grams (0.3 mole) of cylohexyl sulfamic acid in 450 ml. acetone and then adding thereto about 43.8 grams (0.3 mole) of N,N,N',N',-tetrakis (hydroxypropyl)-ethylene diamine (Quadrol) mixed with 50 ml. of acetone to form a precipitated amine salt of cyclohexyl sulfamic acid. The precipitate was filtered and dried for overnight at 40° C. The dried precipitate was ball milled for 2 hours with 3.6 grams hydrophobic fumed silica.

(b) Powder coatings were prepared by grinding and extruding the following components and a weight basis.
58.5 parts hydroxy polyester polymer
6.6 parts tetra (methoxymethyl) glycoluril
1.3 parts flow agent
33.3 parts titanium dioxide pigment
3 parts Catalyst (a)

Films were prepared on steel panels by electrostatic spray and baked for 20 minutes at 350° F. The cured film exhibited 80–160 methyl ethyl ketone (MEK) rubs direct impact. A 20 minute cure at 400° F. exhibited 100–160 MEK rubs direct impact. The cured film had excellent film appearance up to a cured film thickness of 2 mils.

EXAMPLE 2

Similar to Example 1, several powder paint compositions in accordance with this invention were compounded and tested with a catalyst of cyclohexyl sulfamic acid reacted with molar equivalents of triisopropanol amine. This catalyst (2a) and the catalyst of Example 1a were tested with the hydroxyl terminated polyester of Example 1 with the following results.

| | | | BAKE 20 MINUTES AT 400° F.: | | | | |
|---|---|---|---|---|---|---|---|
| Extrusion | Bake | Appearance | Gloss 60°/20° | MEK Rubs | Direct/Reverse Impact | Faber Pencil Hardness | Flexibility Bend |
| 1a | 400° F. | Pinholes at 2.0 mils | 72/39 | 100 | 160/160 | H | Pass |
| 2a | 400° F. | Pinholes at 2.0 mils | 80/48 | 100 | 160/160 | H | Pass |

| | | BAKE 20 MINUTES AT 350° F.: | | | |
|---|---|---|---|---|---|
| Extrusion | Acid Concentration (On Binder) | Solvent Resistance: MEK Rubs | Direct/Reverse Impact | Faber Pencil Hardness | Flexibility Bend |
| 1a | 0.22 | 100 | 20/10 | F | Fail |
| 2a | 0.30 | 100 | 160/160 | H | Pass |

EXAMPLE 3

In contrast, several powder coatings were compounded according to Example 1 except that the catalyst was a prior art catalyst. Results are as follows:

| | | MEK Rubs-DI* | | |
|---|---|---|---|---|
| Powder | Catalyst | 350° F. Bake | 400° F. Bake | Pinholing Thickness |
| X-1529 | PTSA/DMEA | 80–160 | 100–160 | severe wrinkle |
| X-1641 | PTSA/MDEA | 100–160 | 100–160 | pinholes at 1.4 mils |
| X-1809 | PTSA/TIPA | 100–160 | 100–160 | pinholes at 1.2 mils |
| X-211 | PTSA/QDL | 100–80 | 100–160 | texture at |

-continued

| Powder | Catalyst | MEK Rubs-DI* | | Pinholing Thickness |
| --- | --- | --- | --- | --- |
| | | 350° F. Bake | 400° F. Bake | |
| | | | | 1.5 mils |

*DI = Direct Impact (inch-lbs)
PTSA = p-toluene sulfonic acid
DMEA = dimethyl ethanol amine
MDEA = methyl diethanol amine
TIPA = tri-isopropanol amine
QDL = N,N,N',N', -tetrakis (hydroxylpropyl) ethylene-diamine.

The foregoing examples illustrate the merits of this invention, but are not intended to be limiting except by the appended claims.

I claim:

1. A thermosetting powder paint composition containing reactive polymer having a reactive carboxyl, hydroxyl and/or amide groups adapted to be cross-linked upon heating with an aminoplast resin, the improvement comprising:
    said reactive polymer having a molecular weight between 1,000 and 10,000 and selected from epoxy polymer, polyester polymer, acrylic polymer, phenolic polymer, and vinyl polymer said reactive polymer having a melt temperature between 80° C. and 200° C.; and
    said powder paint composition containing by weight at least about 0.25% of a heat curing catalyst of an amine salt of cyclohexyl sulfamic acid, whereby said powder paint compositions are adapted to cure as a paint coating substantially free of surface pinholes.

2. The powder paint composition in claim 1 wherein the composition contains between 0.25% and 0.6% of said catalyst.

3. The powder paint composition in claim 1 wherein the catalyst is an alkyl amine salt of cyclohexyl sulfamic acid.

4. The powder paint composition in claim 1 wherein the catalyst is an aromatic amine salt of cyclohexyl sulfamic acid.

5. The powder paint composition in claim 1 wherein the catalyst is N,N,N',N'-tetrakis (hydroxypropyl)ethylene-diamine salt of sulfamic acid.

6. The powder paint composition in claim 1 wherein the catalyst is a triisopropanol amine salt of cyclohexyl sulfamic acid.

7. In a process of heat curing a thermosetting powder paint coating composition containing a reactive polymer adapted to be cross-linked with an aminoplast resin upon heating wherein the improvement comprises:
    the inclusion of between of at least about 0.25% by weight of heat curing catalyst of an amine salt of cyclohexyl sulfamic acid in the powder paint composition.

* * * * *